Patented Oct. 13, 1936

2,056,992

UNITED STATES PATENT OFFICE 2,056,992

PROCESS FOR PRODUCING ANTIRACHITIC SUBSTANCES

James Waddell, Metuchen, N. J., assignor to E. I. du Pont de Nemours & Company, Wilmington, Del., a corporation of Delaware No Drawing. Application May 24, 1935, Serial No. 23,259

8 Claims. (Cl. 167—81)

This invention relates to a process for producing increased yields of substances having very high antirachitic values, and more particularly relates to a process for producing antirachitically activatable material from substances which are deficient in such material.

As is well known practically all lipoid substances derived from plant and animal sources may be antirachitically activated by suitable treatment, such as with ultra-violet light, cathode rays, and the like. However, with the exception of the sterol, ergosterol, all of these lipoid bodies are activatable only to a limited extent, and when means of separating the active from the inactive fraction are applied, there remains in general a large bulk of material which is practically useless for the further production of antirachitic supplements. Since it has been well shown that irradiated ergosterol leaves much to be desired as an effective antirachitic supplement, the need for investigating and utilizing other sources of provitamin is apparent. As an example, I have discovered that lipoidal substances prepared from animal sources and containing cholesterol have, when antirachitically activated, an exceptionally high efficiency as compared to irradiated ergosterol. However, as mentioned above, the amount of activatable material (provitamin) present in these other lipoidal materials is, unfortunately, small in amount.

It is an object of the present invention to utilize the great quantities of lipoidal substances, particularly cholesterol, which substances were formerly of no value in the production of antirachitic supplements due to the small quantities of activatable constituents which they contain. An additional object is to produce high yields of activatable substances from these materials. A further object is to produce antirachitic supplements from these activatable constituents, which supplements are surprisingly more effective in curing rickets than a similar number of units obtained from ergosterol. A still further object is to utilize substances from which the activatable constituents, or provitamin, have been substantially removed and to produce therefrom large amounts of provitamin which may be activated. Additional objects will appear hereinafter.

These objects are accomplished according to the herein described invention by subjecting the sterol-containing substance to the action of oxidizing substances or atmospheric oxygen under the proper conditions and subsequently or simultaneously activating the provitamin produced thereby with ultra-violet light or other activating means. Cholesterol is, in general, the preferred source of material.

The invention may be more fully understood by reference to the following illustrative examples.

Example 1

0.5 gram of cholesterol which had been rendered deficient in provitamin was dissolved in 24 cubic centimeters of warm ethyl alcohol (95%) and to this solution was added 1 cubic centimeter of a 30% solution of hydrogen peroxide. The warm solution in a quartz flask was then irradiated under a horizontal 110 volt 450 watt Y-type quartz mercury arc (Cooper-Hewitt poultry treater lamp) for a period of 40 minutes. During the irradiation, the flask was connected to a condenser and the flask and contents were heated by a hot plate so that the solution boiled gently.

When the solution treated as above described was subsequently assayed on rachitic rats, it was found to contain an amount of vitamin D 40 to 50 times as much as similar samples treated in exactly the same way except for the absence of the hydrogen peroxide. These results are all the more astonishing when it is recalled that all other investigators have emphasized the deleterious effects of oxygen and oxidizing agents. It is, for example, universally accepted that in the activation of ergosterol, the presence of oxygen or oxidizing substances leads to destruction of the vitamin D produced.

While in the above example I used 1 cubic centimeter of a 30% solution of hydrogen peroxide, I have found that the quantity may be varied within very wide limits and still obtain excellent results. I have used as little as 1 cubic centimeter of a 3% solution of hydrogen peroxide and obtained results almost as good as when I used ten times that amount. It can be seen, therefore, that when carried out as above described, apparently a large excess of the peroxide may be present without producing destruction of the vitamin formed.

Other substances besides hydrogen peroxide may be successfully used to oxidize and/or isomerize the cholesterol during irradiation. As examples, there may be mentioned benzoyl peroxide, eosin in proper dilution, chromic anhydride, etc. It appears that each of the substances brings about formation of provitamin material from cholesterol and this in turn is immediately transformed into vitamin D by the ultra violet light.

In the above example, I oxidized and irradiated the cholesterol at the same time, but these reactions may be separated. Thus, the oxidation may be carried on first and the provitamin formed may be subsequently activated.

Example 2

0.5 gram of provitamin-low cholesterol was dissolved in 24 cubic centimeters of ethyl alcohol and to this was added 1 cubic centimeter of 30% solution of hydrogen peroxide. The resulting solution was then refluxed for 30 minutes over a steam bath, the flask being connected to a condenser. At the end of this treatment, the solution was then irradiated under the quartz mercury vapor lamp as in Example 1 for a period of 10 minutes. The results, as obtained from assays on rachitic rats, showed activation comparable to that procured in Example 1.

Example 3

5 grams of cholesterol deficient in provitamin and 5 grams of benzoyl peroxide were dissolved in 100 cubic centimeters of a mixture of equal parts of ethyl alcohol and glacial acetic acid. The solution was heated to boiling and was gently refluxed for about 15 minutes. The warm solution was then poured, with constant stirring, into 200 cubic centimeters of cold distilled water, and this mixture allowed to stand for a short period. The soft and plastic precipitate was filtered off, washed with water, and then dissolved in hot 0.5 normal alcoholic potassium hydroxide. This solution was refluxed for several minutes and then cooled and diluted with water. The cholesterol and its oxidative derivatives were then extracted by shaking the solution with several portions of ethyl ether. The combined ether extracts were washed with water to remove residual alkali and then dried over anhydrous sodium sulfate and finally the ether was evaporated away. The residue remaining, consisting of cholesterol and its oxidative derivatives, was found to yield, when subsequently irradiated by ultra-violet light, much greater yields of antirachitic vitamin than irradiated samples of the same cholesterol before treatment.

In carrying out the process by the above method, it is important that the oxidation be not carried too far. I have found that, if the treatment is too long, more of the cholesterol is attacked without an increase in provitamin and, indeed, if sufficiently prolonged, leads to products which are practically devoid of provitamin substances. It appears that the greatest yield of provitamin occurs early in the changes brought about by the oxidizing agents, and that, if very active oxidants are used or if high temperatures are employed, best results are obtained by treatments of short duration. This, of course, may also be guarded against by using dilute solutions or by using a limited quantity of the oxidizing agent. For example, I have been able to obtain satisfactory results by the use of such an active agent as chromic anhydride acting on cholesterol in hot glacial acetic acid solution by using a quantity of chromic anhydride which was only 1/5 or 1/8 that of the cholesterol present.

It is to be understood that my method also includes the action of atmospheric oxygen upon cholesterol at elevated temperatures. I have found that by heating provitamin-low cholesterol in the presence of air to a temperature between 150° and 200° C. and maintaining it at such a temperature for a period of two hours that the provitamin content is greatly enhanced. The advantage of the presence of oxygen is shown by the fact that very much lower yields of provitamin are obtained if the cholesterol is heated in a high vacuum. As I have pointed out in my U. S. Patent No. 2,028,364 issued on January 21, 1936, advantageous results are obtained by heating cholesterol in the presence of water, and I have now further found that the presence of air during such heating leads to greater yields of activatable material than where air is excluded.

While I am not to be restricted to any particular theory, it appears that cholesterol, when subjected to treatment by oxidizing agents or means, gives rise to activatable substances. My experiments do not show whether these provitamin materials are isomeric changes or rearrangements of the sterol molecule or whether they are true oxidation products. My results do indicate, however, that the greatest yield of these activatable substances occurs during the initial changes which take place. Therefore, the conditions and length of treatment must be governed by the oxidizing substance used and the speed with which it attacks the sterol molecule. As I have already pointed out, if the treatment is unduly prolonged under severe conditions, more of the cholesterol is destroyed with no compensating increase in yield of provitamin, and indeed, the provitamin formed may, in turn, be destroyed. Nevertheless, certain reagents, such as hydrogen peroxide acting on cholesterol at the temperature of boiling ethyl alcohol, are very satisfactory in that wide latitude in concentration and time of treatment may be permitted without untoward results.

Other sterols may profitably be treated in accordance with the processes herein disclosed. Mixtures of various sterols may also be treated. According to the preferred embodiment of the invention, cholesterol is used.

As many apparently widely different embodiments of this invention may be made without widely departing from the spirit and scope thereof, it is to be understood that the invention is not limited to the specific embodiments thereof except as defined in the appended claims.

I claim:

1. The process of producing an antirachitic substance which comprises subjecting a sterol-containing substance to a mild oxidation treatment of such a nature that the provitamin content of said sterol-containing substance is increased but so limited as to avoid substantial destruction of the provitamin thereby formed, and subsequently or simultaneously activating the provitamin produced thereby.

2. The process according to claim 1 in which the sterol-containing substance which is employed is cholesterol.

3. The process of producing an antirachitic substance which comprises subjecting a solution of cholesterol to a mild oxidation treatment of such a nature that the provitamin content of the cholesterol is increased but so limited as to avoid substantial destruction of the provitamin thereby formed, and subsequently or simultaneously activating the provitamin produced thereby.

4. The process of producing an antirachitic substance which comprises subjecting a solution of cholesterol in ethyl alcohol to a mild oxidation treatment with hydrogen peroxide of such a nature that the provitamin content of the cholesterol is increased but so limited as to avoid substantial destruction of the provitamin thereby formed, and subsequently or simultaneously activating the provitamin produced thereby.

5. The process of producing an antirachitic substance which comprises dissolving 0.5 gram of cholesterol deficient in provitamin in 24 cubic centimeters of warm ethyl alcohol, adding 1 cubic centimeter of a 30% solution of hydrogen peroxide thereto, and boiling said mixture for 40 minutes in a quartz flask while it is being subjected to irradiation from a quartz mercury vapor lamp.

6. The process of producing an antirachitic substance which comprises dissolving 0.5 gram of provitamin-low cholesterol in 24 cubic centimeters of ethyl alcohol, adding 1 cubic centimeter of a 30% solution of hydrogen peroxide thereto, refluxing the resulting solution for 30 minutes, and subsequently irradiating the solution for 10 minutes under a quartz mercury vapor lamp.

7. The process of producing an antirachitic substance which comprises dissolving 5 grams of cholesterol deficient in provitamin and 5 grams of benzoyl peroxide in 100 cubic centimeters of a mixture of equal parts of ethyl alcohol and glacial acetic acid, heating the solution to boiling and gently refluxing for about 15 minutes, pouring the warm solution into cold water, filtering off the precipitate, dissolving the precipitate in hot 0.5 normal alcoholic potassium hydroxide, refluxing this solution for several minutes, extracting cholesterol and its oxidative derivatives from the solution with ethyl ether, washing the combined ether extracts with water to remove residual alkali, drying the extracts, evaporating the ether therefrom, and irradiating the residue remaining with ultra-violet light.

8. The process of producing an antirachitic substance which comprises heating provitamin-low cholesterol in the presence of air to a temperature between 150° C. and 200° C. for a period of several hours, and subsequently or simultaneously activating the provitamin produced thereby.

JAMES WADDELL.